United States Patent [19]

Akabane et al.

[11] Patent Number: 5,267,185

[45] Date of Patent: Nov. 30, 1993

[54] APPARATUS FOR CALCULATING MATRICES

[75] Inventors: Toshio Akabane, Tenri; Yoshiji Fujimoto; Naoyuki Fukuda, both of Nara, all of Japan

[73] Assignee: Sharp Kabushiki Kaisha, Osaka, Japan

[21] Appl. No.: 798,939

[22] Filed: Nov. 27, 1991

Related U.S. Application Data

[63] Continuation-in-part of Ser. No. 509,380, Apr. 13, 1990, abandoned.

[30] Foreign Application Priority Data

Apr. 14, 1989 [JP] Japan ................................. 1-96079

[51] Int. Cl.$^5$ .............................................. G06F 7/52
[52] U.S. Cl. ....................................... 364/736; 364/754
[58] Field of Search ............. 364/736, 754, 402, 750.5

[56] References Cited

U.S. PATENT DOCUMENTS

| | | | |
|---|---|---|---|
| 4,493,048 | 1/1985 | Kung et al. | 364/754 |
| 4,914,615 | 4/1990 | Karmarkar et al. | 364/754 |
| 4,937,776 | 6/1990 | Myers et al. | 364/736 |
| 4,945,506 | 7/1990 | Baji et al. | 364/736 |

*Primary Examiner*—Long T. Nguyen
*Attorney, Agent, or Firm*—David G. Conlin; Henry D. Pahl, Jr.

[57] ABSTRACT

An apparatus for calculating a sum of products of proper elements in matrix, connected to a receiving device (21) for receiving an input vector and having a memory (11, 12) capable of storing data used to determine whether each of the matrix elements is zero or nonzero and storing data representative of contents of the matrix elements having nonzeros, the apparatus being capable of reducing a required capacity of the memory (11, 12) and a number of calculation processes in a linear transformation of the input vector received at the receiving device (21) by using a transformation matrix having matrix elements of a large scale sparse matrix, the transformation matrix being represented in a two-dimensional array and stored in the memory (11, 12), the apparatus includes a determining unit connected to the memory (11, 12) for determining whether each of the matrix elements in the transformation matrix is zero or nonzero in accordance with the zero data or the nonzero data stored in the memory (11, 12), and a calculating unit (1) connected to the receiving device (21), the determining unit (2), the memory (11, 12) and the outputting device (22) respectively for calculating the sum of products of the nonzero data store in the memory (11, 12) with the input vector with respect to each of the matrix elements which is identified as nonzeros by the determining unit (2).

13 Claims, 9 Drawing Sheets

Fig. 9

| | |
|---|---|
| | $p_1 + 1$ |
| $q_1 - 1$ { | 1 |
| | 1 |
| | $p_2 + p_3 + 1$ |
| $q_2 + q_3 - 1$ { | 1 |
| | ⋮ |
| | 1 |
| | $p_4 + 1$ |
| | $p_5 + 1$ |
| $q_5 - 1$ { | 1 |
| | $p_6 + 1$ |
| $q_6 - 1$ { | 1 |
| | 1 |
| 411 — | $p_7 + 1$ |

Fig. 12

| |
|---|
| $p_1$ |
| $q_1$ |
| $p_2 + p_3$ |
| $q_2 + q_3$ |
| $p_4$ |
| $q_4$ |
| $p_5$ |
| $q_5$ |
| $p_6$ |
| $q_6$ |
| $p_7$ |

| |
|---|
| $p_1$ |
| $q_1$ |
| $p_2$ |
| delim |
| $p_3$ |
| $q_2$ |
| delim |
| $q_3$ |
| $p_4$ |
| $q_4$ |
| delim |
| $p_5$ |
| $q_5$ |
| $p_6$ |
| delim |
| $q_6$ |
| $p_7$ |

431

APPARATUS FOR CALCULATING MATRICES

CROSS-REFERENCES TO RELATED APPLICATION

This application is a continuation-in-part application of U.S. Ser. No. 509,380 filed on Apr. 13, 1990, now abandoned.

BACKGROUND OF THE INVENTION

1. Field of the Invention

The present invention relates to an apparatus for calculating matrices, in particular, for calculating multiplication of a vector by a matrix containing a large number of zero components (sparse matrices).

2. Description of the Related Art

In simulation of natural phenomena utilizing computers, it is common practice to calculate the linear transformation of vectors represented in a one-dimensional array by using a matrix represented in a two-dimensional array as a transformation matrix.

For example, the matrix calculations shown as Equations (1) and (2) are known.

$$y = Wx \quad (1)$$

$$V^t = u^t W \quad (2)$$

where $x = (x_1, x_2, x_3, \ldots, x_M)^t$ represents an input vector, $y = (y_1, y_2, y_3, \ldots, y_M)^t$ represents an output vector, $W = \{Wji\}$ represents a transformation matrix of N rows × M columns for linear transformation, $u = (u_1, u_2, u_3, \ldots, u_N)^t$ represents an input vector, $v = (v_1, v_2, v_3, \ldots, v_M)^t$ represents an output vector, and in the above-mentioned notation, $(*)^t$ represents a transposed matrix of matrix * in which rows and columns are swapped.

A known matrix calculating apparatus such as a vector processor is provided with a memory for storing data representative of each element Wji of the transformation matrix W, memory device for storing calculation algorithms for calculating the product sum of the element Wji and the element of the input vector, and calculating device for executing calculations in accordance with the calculation algorithms. In calculating Equation (1), the conventional matrix calculating apparatus is adapted to calculate an output $y_j = (j = 1, 2, \ldots, N)$ in accordance with the following equation (3):

$$y_j = \sum_{i=1}^{M} Wji x_i \quad (3)$$

In calculating Equation (2), the conventional matrix calculating apparatus is adapted to calculate an output $v_i = (i = 1, 2, \ldots, N)$ for each column in accordance with the following equation (4):

$$v_i = \sum_{i=1}^{N} Wji u_j \quad (4)$$

The calculations of Equations (3) and (4) are diagrammatically shown in FIGS. 1 and 2, respectively.

When the above-described matrix calculations are applied to the simulation of an actual phenomenon, there is a case where a large proportion of the elements Wji of the transformation matrix W are elements of zeros (hereinafter referred to as "zero elements"). For example, in the simulation of a neural network, transmission signals which are transmitted from one group of neurons to another group of neurons may be expressed in terms of the linear transformation y = Wx, using an output from each element of transmitter as an input vector x, which utilizes the strength of connection (hereinafter referred to as "weight") from each element on the transmitter to a corresponding element on the receiver as a transformation matrix W. In this case, it is a rare case that connections are made between all the neurons of the respective groups. Rather, in many cases, the weights between the respective neurons, that is, the elements of the transformation matrix W may include a large proportion of zero elements (sparse matrix). This tendency increases as the scale of the neural network increases.

In such a case, the known calculating apparatus needs to store the elements Wji of the transformation matrix W of N rows times M columns, i.e., N rows × M columns by directly allocating the elements Wji for memory as real numbers N times M, i.e., N × M as the same as operating the matrices having a large proportion of non-zero elements, and each of multiplication and addition must be repeated N times for each matrix calculation. Consequently, unnecessary zero elements must be stored and calculated.

SUMMARY OF THE INVENTION

It is an object of the present invention to provide an apparatus for calculating a sum of product of proper elements in matrix, the apparatus connected to a receiving device for receiving an input vector and having a memory which is capable of storing data used to determine whether each of the matrix elements is zero or nonzeros and capable of storing data representative of contents of the matrix elements having nonzeros, the apparatus being capable of reducing a required capacity of the memory and a number of calculation processes in a linear transformation of the input vector received at the receiving device by using a transformation matrix having matrix the matrix being represented in a two-dimensional array and stored in the memory, the apparatus comprises a determining unit connected to the memory for determining whether each of the matrix elements in the transformation matrix is zero or nonzeros in accordance with the zero data or the nonzeros data stored in the memory, and a calculating unit connected to the receiving device, the determining unit, the memory and the outputting device respectively for calculating the sum of product of the nonzeros data store in the memory with the input vector with respect to each of the matrix elements which is identified as nonzeros by the determining unit.

Preferably, the memory is arranged to store data for specifying the matrix elements having nonzeros by using an integer to give a count of the matrix elements having nonzeros that are consecutively arranged.

More preferably, the memory includes an index table for storing integers, each of the integers giving a count of the matrix elements having zero that are consecutively arranged. and a pointer for pointing out each of the integers store in the index table.

Further preferably, the index table is capable of storing an integer (pi+1) which is obtained by adding an integer 1 to a number pi placed on a left side of each the matrix elements having nonzeros by using the calculating unit, the pi representing a number including the matrix elements having zero arranged in a row direction, the integer pi+1 being expressed with a n-bit data, the n representing a positive integer.

Furthermore, preferably, the index table is further capable of storing a number $q_i$-1 of the integer 1 consecutively, the $q_i$ representing a number of the matrix elements having nonzeros which are arranged consecutively in a row direction.

The index table is also capable of storing an end of row symbol at a time when an end of each of the row is reached.

The index table is so arranged that the end of row symbol is registered when each of the matrix elements having zero presents at the end of the each row, preferably, The index table is so arranged that the integer obtained by adding an integer 1 to the number $p_i$ which the matrix elements having zero are arranged is registered by using the calculating unit, the matrix elements having zero being consecutively arranged from an end of a current row to a beginning of a next row, preferably.

The index table is so arranged that a number obtained by adding an integer 1 to a sum of numbers is registered without using the end of row symbol by using the calculating unit, the sum of numbers being obtained by summing a number of the matrix elements having zero which are arranged at the end of the current row with a number of the matrix elements having zero which are arranged at the beginning of the next row, preferably.

Moreover, the index table is so arranged that the number $q_i$ of the matrix elements having nonzeros is registered independently of the number $p_i$ of the matrix elements having zero, preferably.

Preferably, the number $p_i$ and the number $q_i$ are identified in accordance with the most significant bit in the n-bits per word in a case that the matrix elements having nonzeros are arranged in the table.

Further preferably, the matrix elements having zero and the matrix elements having nonzeros are added twice by using the calculating unit, respectively, in order to register a resulting integer ($p_i + p_i + 1$) or ($q_i + q_i + 1$) in a case that the matrix elements having zero or the matrix elements having nonzeros are arranged to be continued from the end of the current row to the beginning of a succeeding row of the current row.

More preferably, a maximum number in which the matrix elements having zero or the matrix elements having nonzeros are arranged is registered as an end of row symbol at a time when the end of the row is reached.

The end of row symbol is preferably registered in a case that a number of the matrix elements having zero or the matrix elements having nonzeros are arranged is placed at the end of the row.

The apparatus further includes an output device connected to the calculating unit for outputting an output vector which is an output of the calculating unit, preferably.

In operation, the identifying unit refers to the data stored in the first memory and, if the element referenced in the matrix is zero, proceeds to refer to the next element without performing any calculations. If the element referenced is not zero, the data stored in the second memory by the calculating unit is multiplied by the element of the input vector which corresponds to that data. For one row or column, the product sum is calculated and set as one element of the output vector. For all the row or columns, the calculations are performed to obtain all the elements of the output vector.

In the above matrix calculations, if nonzero elements occupy, for example, k percentage (%) of all the elements (N×M real numbers) of the matrix, the memory capacity of the second memory which is required to store all the elements of the matrix is N×M×k/100 in real number. Also, it is sufficient that multiplication and addition are each performed by N×M×k/100 times for each matrix calculation. Accordingly, if the present of nonzero elements is small (k is small), the number of stored elements of the matrix and the number of times of calculations can be reduced.

If the first memory is to store therein data which specifies a zero element with an integer representative of a number in which zero elements are consecutively arranged, the number of times of decisions as to whether the data represents a zero element or a nonzero element can be reduced. The required memory capacity of the first memory corresponds to approximately N×M×k/100 elements in integer. Accordingly, if this k is small, the memory capacity required to specify each element of the matrix as zero or nonzero can be reduced.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 9 shows the contents of the index table used in a second embodiment of the present invention;

FIG. 12 shows the contents of the index table used in a third embodiment of the present invention;

FIG. 15 shows the contents of the index table used in a fourth embodiment of the present invention;

DESCRIPTION OF THE PREFERRED EMBODIMENTS

Embodiments of an apparatus for calculating matrices in accordance with the present invention will be explained below in detail with reference to the accompanying drawings.

Figure 1:
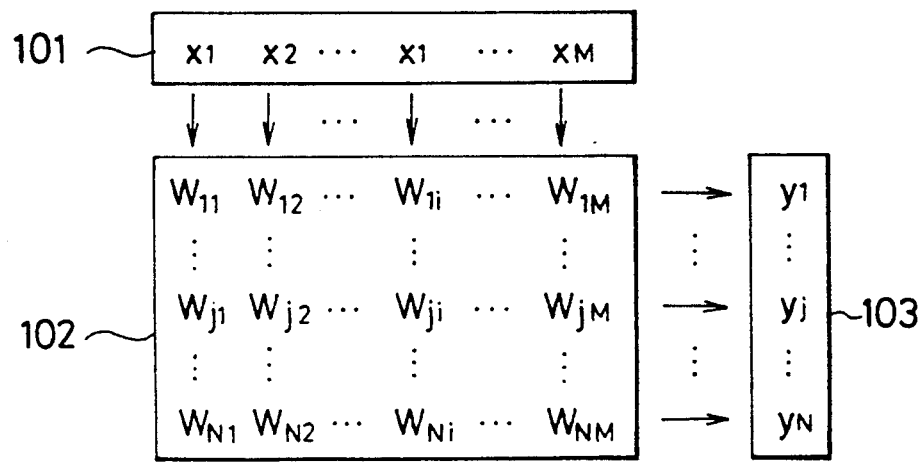
FIG. 1 is a block diagram showing calculations utilizing a known matrix calculating apparatus.
Figure 2:
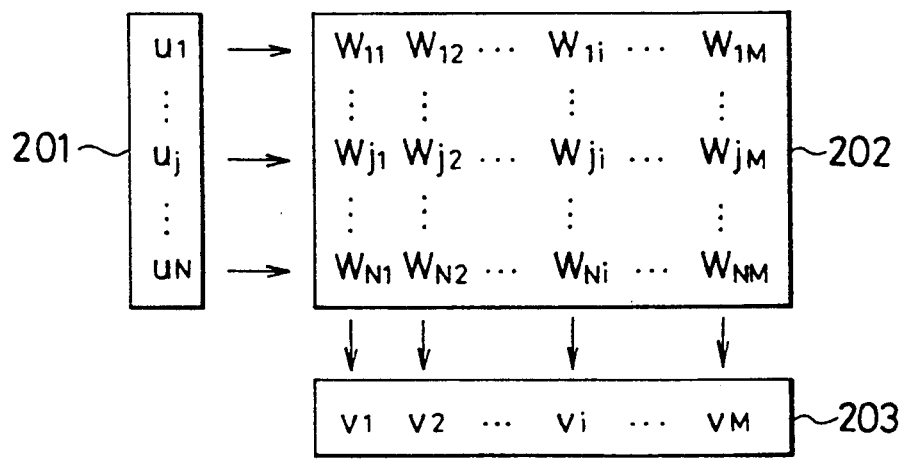
FIG. 2 is a block diagram showing calculations utilizing another known matrix calculating apparatus.
Figure 3:
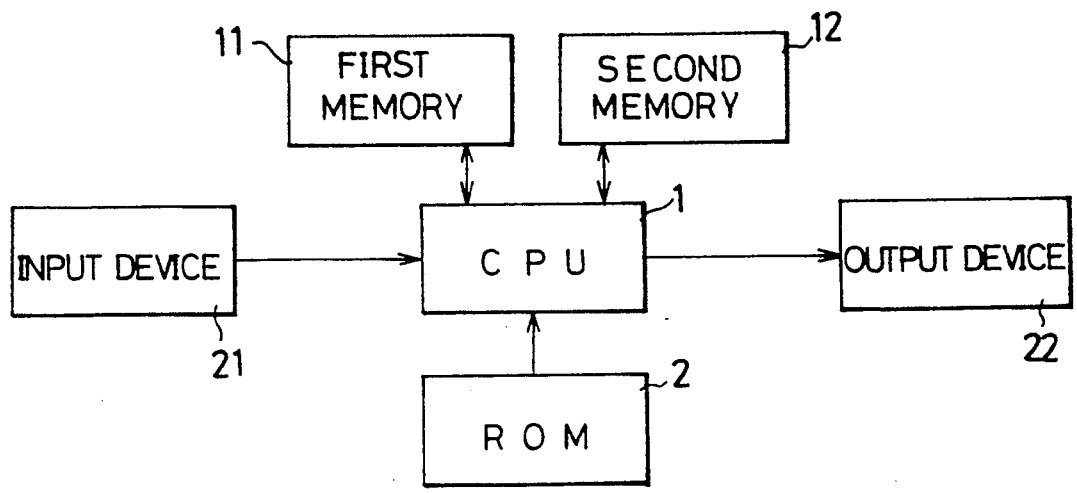
FIG. 3 is a block diagram showing the construction of a first embodiment of an apparatus for calculating matrices according to the present invention.

FIG. 3 is a schematic block diagram showing a first embodiment of the present invention. The illustrated apparatus for calculating matrices includes a CPU (Central Processing Unit) 1, a ROM 2 for storing predetermined calculation algorithms, first and second memories 11 and 12 for storing information of a transformation matrix W, an input device 12 for inputting information of an input vector $x = (x_i, \ldots, x_j, \ldots, x_M)^t$ or $u = (u_i, \ldots, u_j, \ldots, u_N)^t$, and an output device 22 for outputting information of an output vector $y = (y_i, \ldots, y_j, \ldots, y_M)^t$ or $v = (v_i, \ldots, v_j, \ldots, v_N)^t$.

Figure 4:
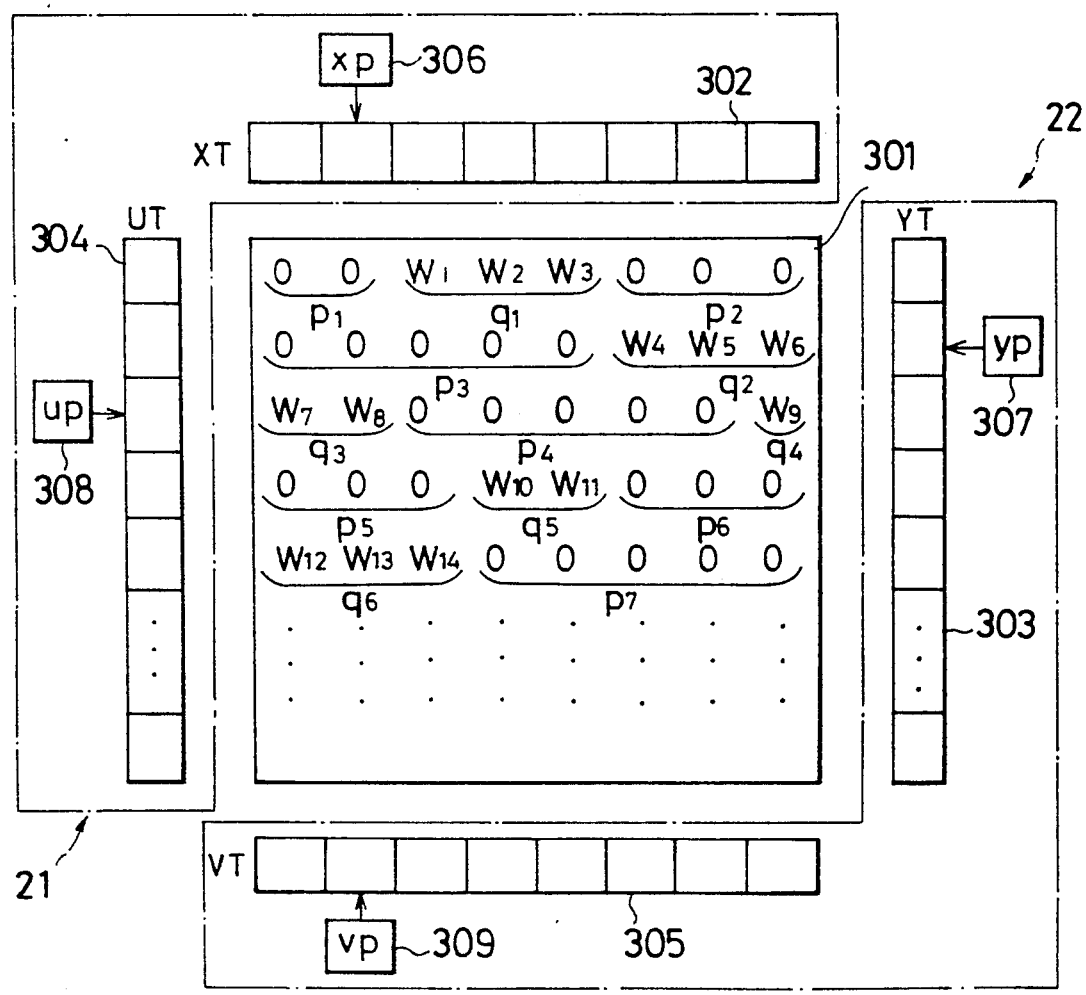
FIG. 4 is a block diagram showing the input/output buffers, the pointers and the elements of the transformation matrix W used in the embodiments of the present invention.

The CPU 1 receives data representative of each element of the input vector x from the input device 21, refers to the first memory 11 and the second memory 12, calculates the linear transformation of the input vector x or u in accordance with the calculation algorithms stored in the ROM 2, and outputs data representative of the output vector y or v to the output device 22. As shown in FIG. 4, the input device 21 includes an input buffer 302 capable of holding data representative of each element xi of the input vector x, a pointer (pointer value: xp) 306 for pointing out each data XTxp (xp=1, 2, ..., M) of the input buffer 302, an input buffer 304 capable of holding data representative of each element uj of the input vector u, and a pointer (pointer value: up) 308 for pointing out each data UTup (up=1, 2, ..., N) of the input buffer 304. The output device 22 includes an output buffer 303 capable of holding data representative of each element yj of the input vector y and of serving also as a product sum calculating buffer, a pointer (pointer value: yp) 307 for pointing out each data YTyp (yp=1, 2, ..., N) of the output buffer 303, an output buffer 305 capable of holding data representative of each element vi of the output vector v, and a pointer (pointer value: vp) 309 for pointing out each data VTvp (vp=1, 2, ..., M) of the output buffer 305.

In FIG. 4, numerical number 301 represents each elements Wji of the transformation matrix W in a two-dimensional array, as an example to explain the function of the calculating apparatus. In the drawing, "0" represents a zero element corresponding to Wji=0, "W" represents a nonzero element corresponding to Wji=0, "Pi" represents a number including zero elements which are arranged in the row direction, and "qi" represents a number including nonzero elements which are arranged in the row direction.

Figure 5:
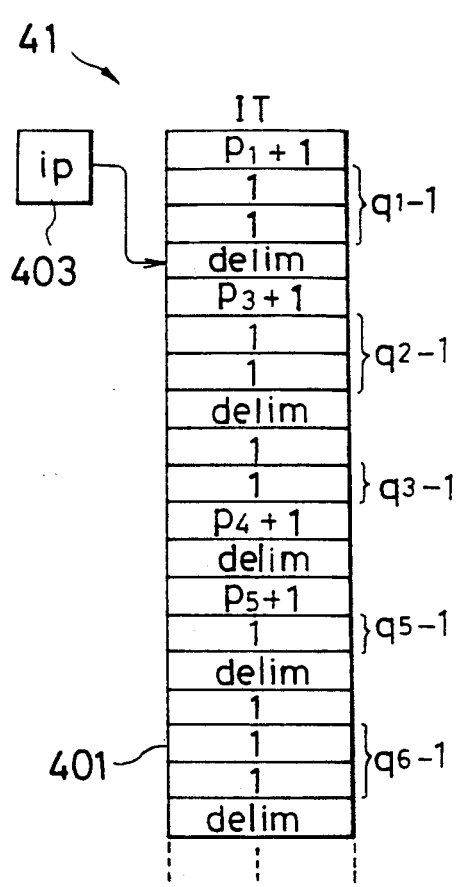
FIG. 5 shows the contents of the index table used in the first embodiment of the present invention.

As shown in FIG. 5, the first memory 11 includes an index table 401 for storing integers each of which represents a number including zero elements in the transformation matrix W which are consecutively arranged, and a pointer 403 (pointer value: ip) for pointing out each data ITip (ip=1,2, ...) of the index table 401.

Figure 6:
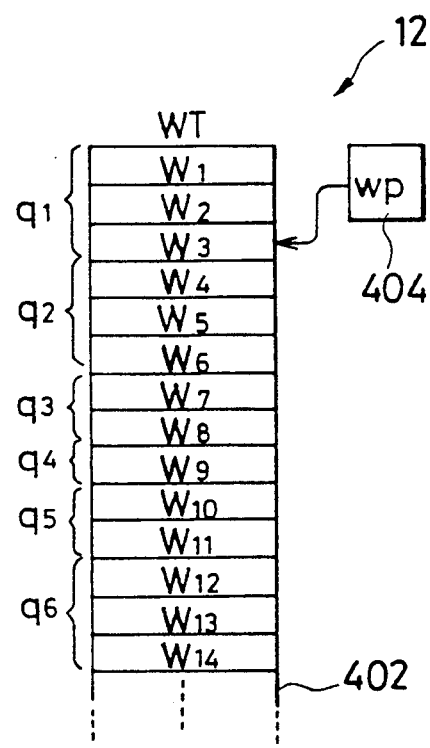
FIG. 6 shows the contents of the weight memory used in the embodiments of the present invention.

As shown in FIG. 6, the second memory 12 includes a weight memory 402 which stores data representing the contents of the nonzero elements in the transformation matrix W in sequence, and a pointer 404 (pointer value: wp) for pointing out each data WTwp (wp=1,2, ...) of the weight memory 402.

The contents of the index table 401 and the weight memory 402 are produced in the following manner. Each row in the transformation matrix W 301 shown in FIG. 4 is examined from left to right in ascending order from the first row. If a nonzero element is found, data representative of its contents (real number) is stored in the weight memory 402, while an integer (pi+1) obtained by adding 1 to the number "pi" which is placed on the left wide of the nonzero element is expressed with n-bit data and stored in the index table 401. (This process is hereinafter referred to simply as "to register an integer".)

If a neighbor element on the left side of the nonzero element is also nonzero element, an integer to be registered is 1 because pi=0. If the number of qi of the nonzero elements are arranged, then the number of (qi−1) of integers "1" are consecutively registered on the index table 401. When the end of each row is reached, the end-of-row symbol "delim" (delim=$2^n-1$) is registered. If a zero element is placed at the end of the row, a number (to an element on left side is non-zero and without any zero elements is arranged then it will be 1) which consists of the arrangement of zero elements containing the zero element placed at the end of the row is not registered, and the end-of-row symbol "delim" is registered. If an integer is to be expressed with the n-bit data (one word), the integer which can be expressed is up to ($2^n-1$). However, since the integer ($2^n-1$) is used as the end-of-row symbol "delim" as described above, the integer which can be expressed with one word is up to ($2^n-2$). If ($2^n-2$) or more zero elements are arranged, two words or more are used to register the corresponding number. For example, if the number of "pi" is the number of zero elements arranged and if the following expression is possible.

$$pi + 1 = (2^n - 2)a + b$$

a, b: integers
$0 \leq a, 0 \leq b \leq (2^n - 2)$ then (a+1) words are used to express the corresponding number. More specifically, data of words with the number of "a" is set to ($2^n-2$) and the last one word is set to "b".

This matrix calculating apparatus executes the following calculations by utilizing the number of "pi" in which zero elements are arranged in the transformation matrix W and the end-of-row symbol "delim" as indexes.

Figure 7:
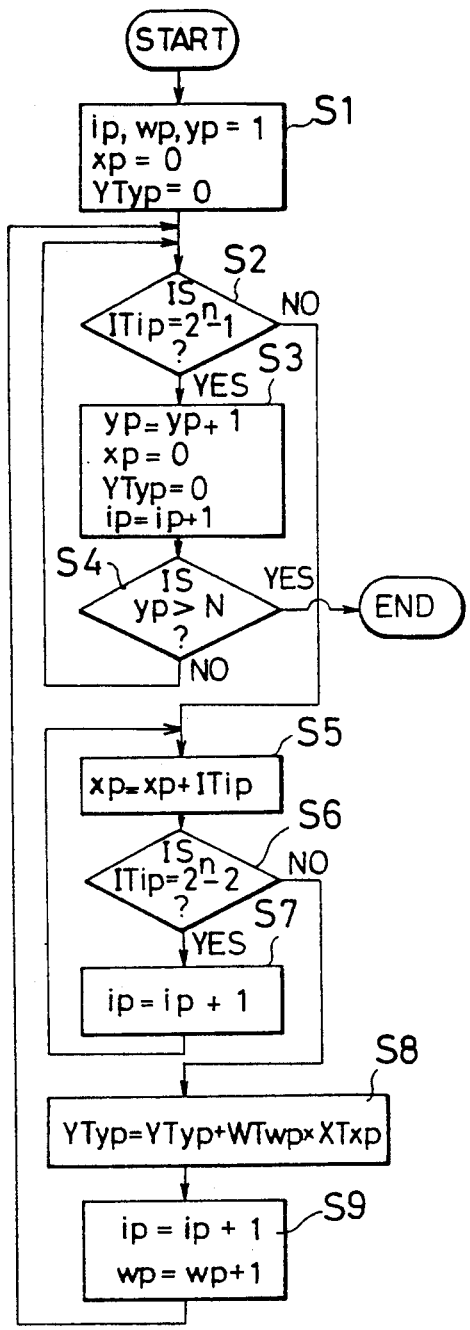
FIG. 7 is a flowchart showing the calculation algorithm used in the first embodiment of the present invention.

If Equation (1) is calculated as the linear transformation of the input vector x, the calculation is executed in accordance with the calculation algorithms shown in FIG. 7.

As shown in Step $S_1$, the pointer values ip, wp, yp of the pointers 403, 404 and 307 are set to "1" respectively, while the pointer value xp of the pointer 306 is reset to "0". The data YTyp (yp=1, ..., M) of the output buffer 303 is reset to "0" (initialized). Then, it is determined whether or not the data ITip of the index table 401 is the end-of-row symbol "delim" (=$2^n-2$) (step $S_2$). If the end-of-row symbol "delim" is present, a line feed is performed (Step $S_3$). If the end-of-row symbol "delim" is absent, a shift of ITip is performed in the row direction (Step $S_5$) and it is determined whether or not ITip is the maximum ($2^n-2$) (Step $S_6$). In the case of the maximum, the succeeding data on the index table 401 is examined ($S_7$). If not so, the product "WTwp×XTxp" is added to YTyp ($S_8$). The pointer value wp is incremented by one so that the succeeding data can be fetched from the weight memory 404, and the succeeding data on the index table 401 is examined ($S_9$). The process returns to Step $S_2$, where it is determined whether or not the data ITip is the end-of-row symbol "delim". If the end-of-row symbol "delim" is present, the line feed is performed ($S_3$). Subsequently, when examination of up to an N line is completed, the calculation is finished.

Figure 8:
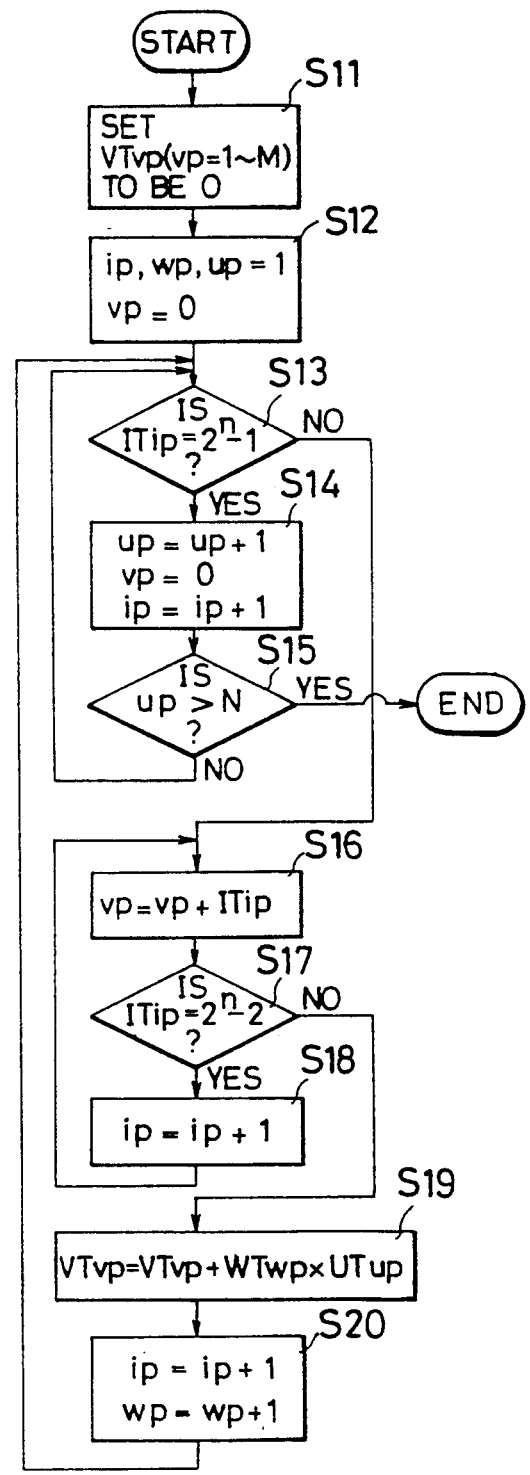
FIG. 8 is a flowchart showing another calculation algorithm used in the first embodiment of the present invention.

If Equation (2) for the linear transformation of the input vector $u'$ is calculated, the calculation is performed with a procedure similar to the above-described one in accordance with the calculation algorithms shown in FIG. 8.

If it is found from the calculations described above that nonzero elements occupy, for example, k % of all the elements (N×M real numbers) in the transformation matrix W of N rows×M columns, the memory capacity of the weight memory 402 which is required to store the elements of the matrix W is N×M×k/100 in a real number, while the required memory capacity of the index table 401 is approximately N×M×k/100 in an integer number. Accordingly, it is possible to reduce the memory capacity required to store the elements of the transformation matrix W in which the percentage of nonzero elements is small (k is small). Moreover, multiplication and addition are performed by N×M×k/100 for each of the above matrix calculating operations respectively, whereby the number of calculations can be reduced for small k.

The following is an explanation of a second embodiment of the present invention.

The calculating apparatus according to the second embodiment is provided with the index table 411 shown in FIG. 9, instead of the index table 401 used i the first embodiment. The remaining arrangement is substantially the same as that of the first embodiment. The contents of the index table 411 are produced in the following manner. Initially, the integer (pi+1) obtained by adding 1 to the number pi which indicates the number of zero elements arranged, is registered in the index table 411, as in the case of the index table 401. In this step, however, the end-of-row symbol "delim" is not used. If the arrangement of zero elements continues from the end of the current row to the beginning of the next row, a number which corresponds to a zero-element arrangement containing the zero element placed at the end of the current row is added to a number which corresponds to a zero-element arrangement containing the zero-element placed at the beginning of the next row. The addition result and a number 1 are added together and registered in the index table 411. For example, referring to the end of the first row and the beginning of second row in the transformation matrix W shown in FIG. 4, the integer ($p_2+p_3+1$) is registered.

Figure 10:
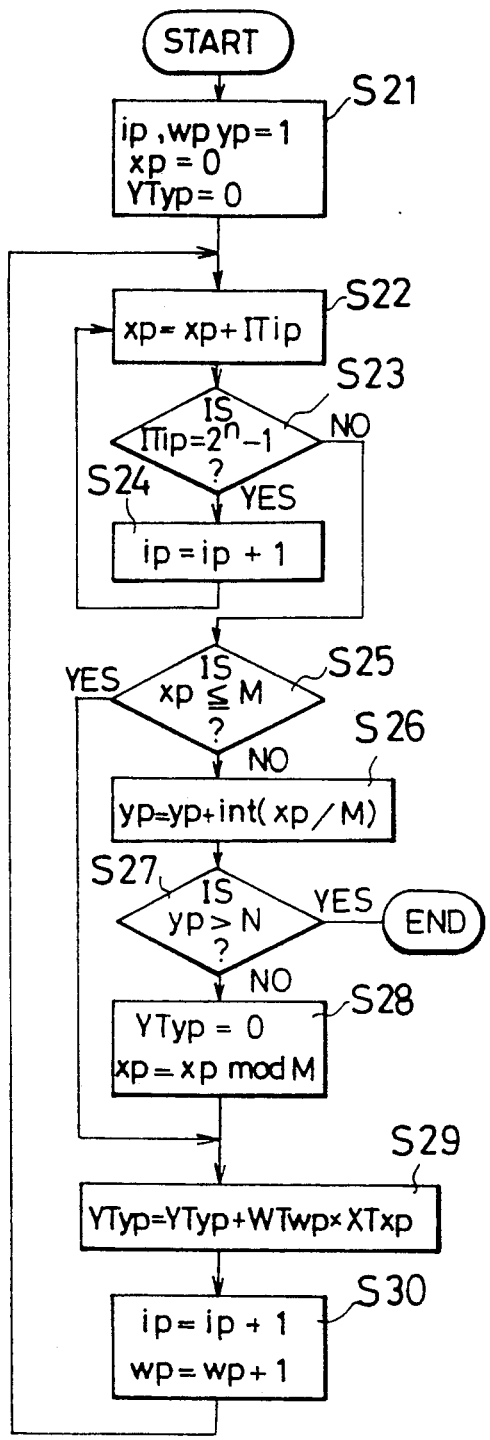
FIG. 10 is a flowchart showing the calculation algorithm used in the second embodiment of the present invention.
Figure 11:
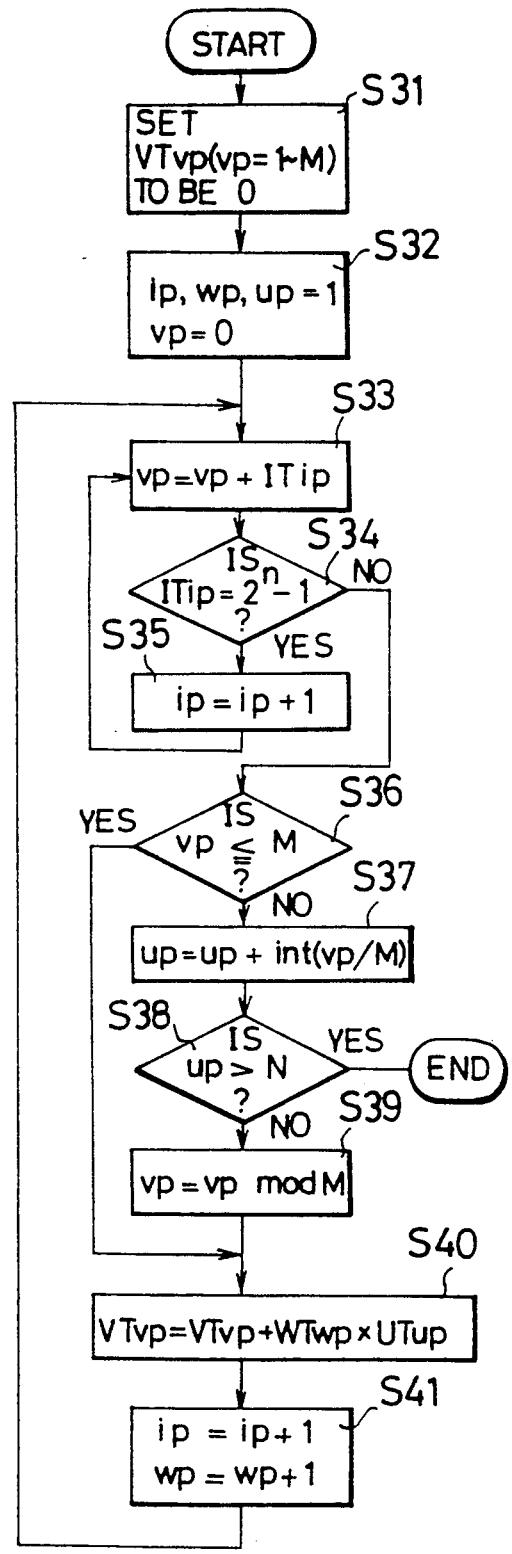
FIG. 11 is a flowchart showing another calculation algorithm used in the second embodiment of the present invention.

If Equations (1) and (2) for linear transformation of the respective input vectors x and $u'$ are calculated, the calculation is performed in accordance with the calculation algorithms shown in FIGS. 10 and 11 respectively. For the sake of simplicity, the same symbols are used to denote the same data and pointer values as those used i the first embodiment, and this explanation also applies to third and fourth embodiments which will be described later. The procedure of the second embodiment is substantially the same as that of the first embodiment, except for the following point. In the second embodiment, for the calculation of Equation (1), xp and M are compared to detect the end of the current row and, if xp>M, it is determined that rows have been changed (Step $S_{25}$), and yp is incremented by int(xp/M) (Step $S_{26}$). For the calculation of Equation (2), vp is used instead. The symbol "int(*)" indicates the integer part of the value of the expression in parentheses.

The following is an explanation of the third embodiment of the present invention.

The calculating apparatus according to the third embodiment is provided with the index table 421 shown in FIG. 12, instead of the index table 401 used in the first embodiment. The remaining arrangement is substantially the same as that of the first embodiment. The index table 421 is arranged to register the number pi in which zero elements are arranged, independently of the number qi in which nonzero elements are arranged. More specifically, if nonzero elements are arranged, although the first and second embodiments are each arranged to separately register (qi−1) integers 1, the integer qi is registered as one piece of data. The most significant bit of n bits per word is used to identify the number pi including the arrangement of zero elements and the number qi including the arrangement of nonzero elements. If the arrangement of zero elements or nonzero elements continues from the end of the current row to the beginning of the succeeding row, the numbers placed at the end of the current row and the beginning of the succeeding row are added together to obtain the integer ($p_i+p_{i+1}$) or ($q_i+q_{i+1}$), and this integer is registered in the index table 421.

Figure 13:
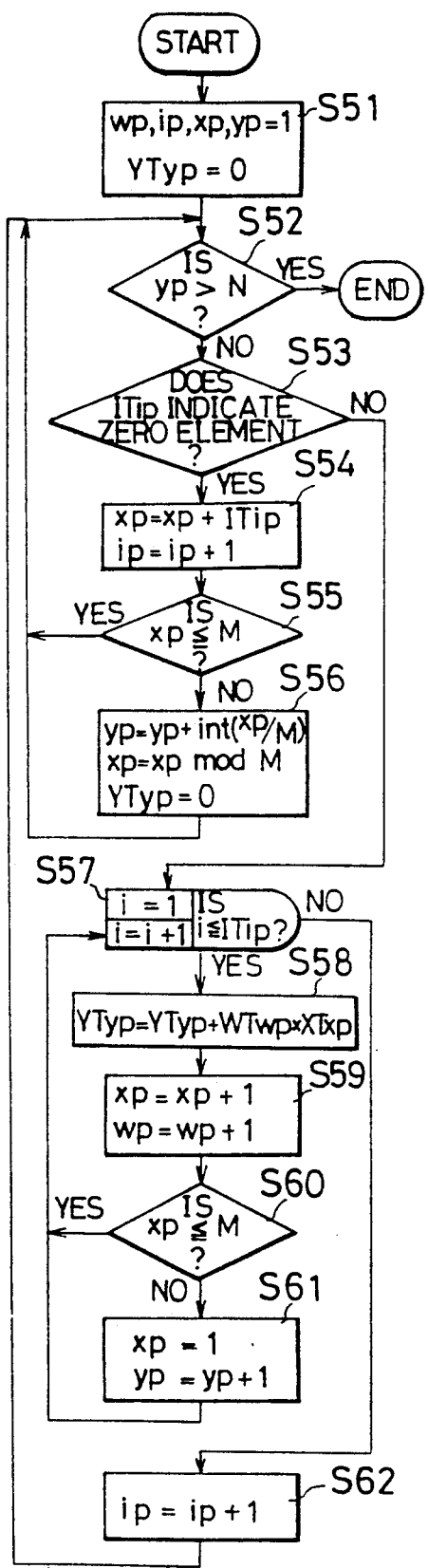
FIG. 13 is a flowchart showing the calculation algorithm used in the third embodiment of the present invention.
Figure 14:
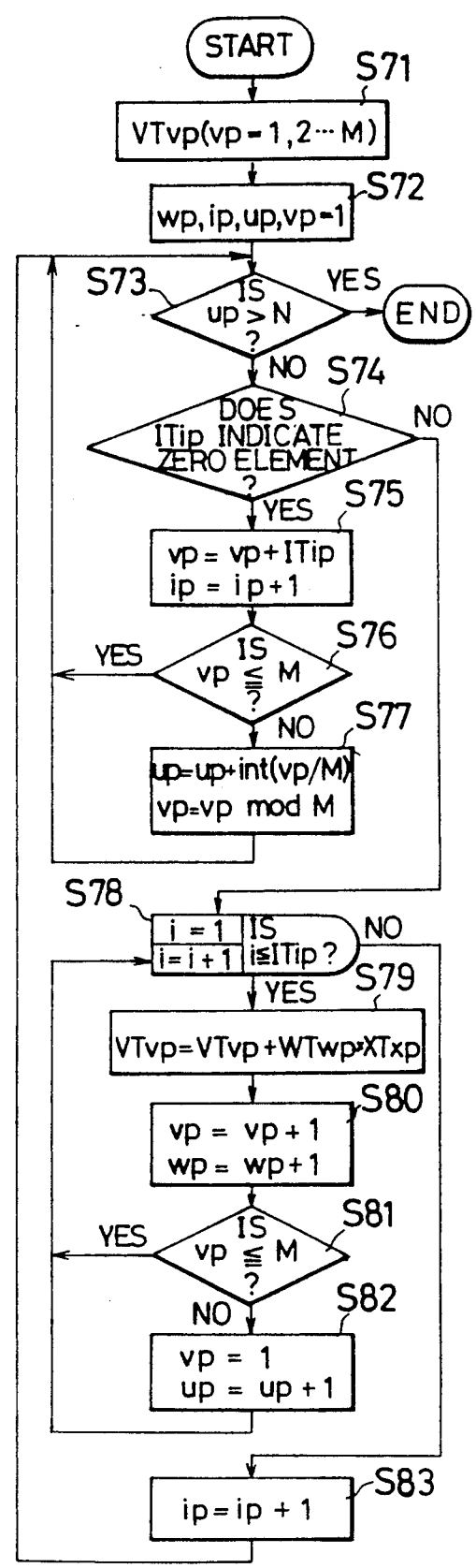
FIG. 14 is a flowchart showing another calculation algorithm used in the third embodiment of the present invention.

If equations (1) and (2) for linear transformation of the respective input vectors x and $u'$ are calculated, the calculation is executed in accordance with the calculation algorithms shown in FIGS. 13 and 14. The procedure of the third embodiment is substantially the same as that of each the first and second embodiments, except for the following point. In the third embodiment, it is determined (Step $S_{53}$ or $S_{74}$) whether ITip indicates a zero element or a nonzero element. If ITip indicates a zero element, xp or vp of the corresponding number only is skipped (Step $S_{54}$ or $S_{75}$). If ITip indicates a nonzero element, the product sum of the input XTxp and the weight WTwp (Step $S_{57}$ or $S_{75}$) is calculated for the corresponding number only (Step $S_{57}$ through $S_{61}$ or Step $S_{78}$ through $S_{82}$). As in the case of the second embodiment, it is determined (Step $S_{60}$ or $S_{80}$) whether or not the end of the row has been reached midway in the current process, by comparing the value of xp or vp with the value of M.

The following is an explanation of the fourth embodiment of the present invention.

The calculating apparatus according to the fourth embodiment is provided with the index table 431 shown in FIG. 15, instead of the index table 401 used in the first embodiment. The remaining arrangement is substantially the same as that of the first embodiment. The index table 431 is arranged to register the number pi in which zero elements are arranged, independently of the number qi in which nonzero elements are arranged. In the fourth embodiment, however, when the end of the row is reached, the maximum of a number in which zero elements or nonzero elements are arranged is registered as the end-of-row symbol "delim". If a number including a zero element or the arrangement of zero elements is placed at the end of the row, neither 1 nor that number is registered and the end-of-row symbol "delim" is registered.

Figure 16:
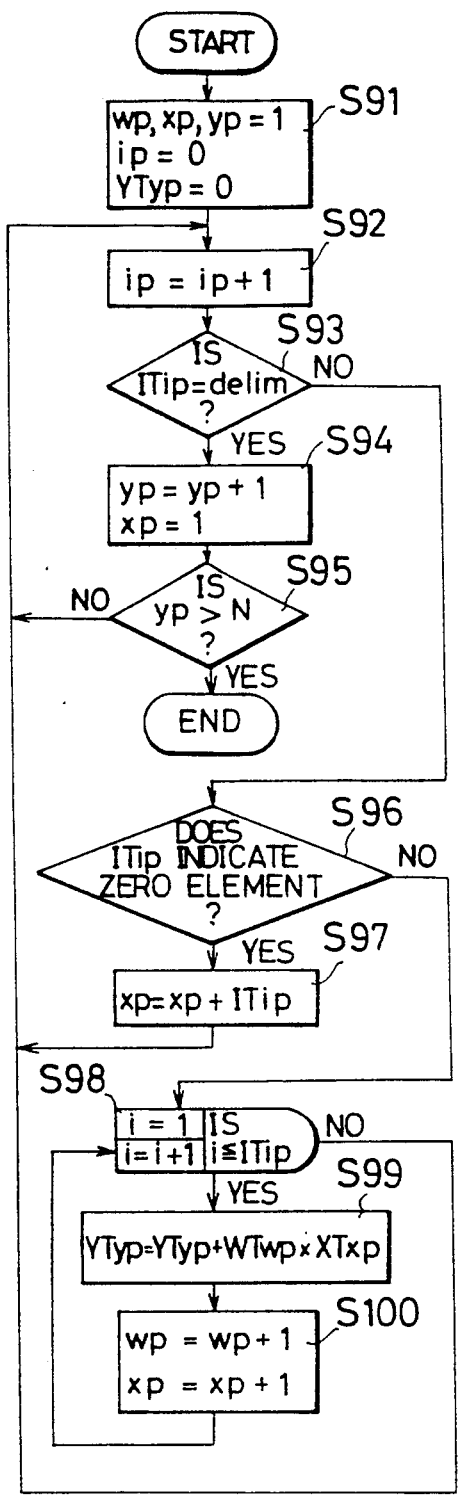
FIG. 16 is a flowchart showing the calculation algorithm used in the fourth embodiment of the present invention.
Figure 17:
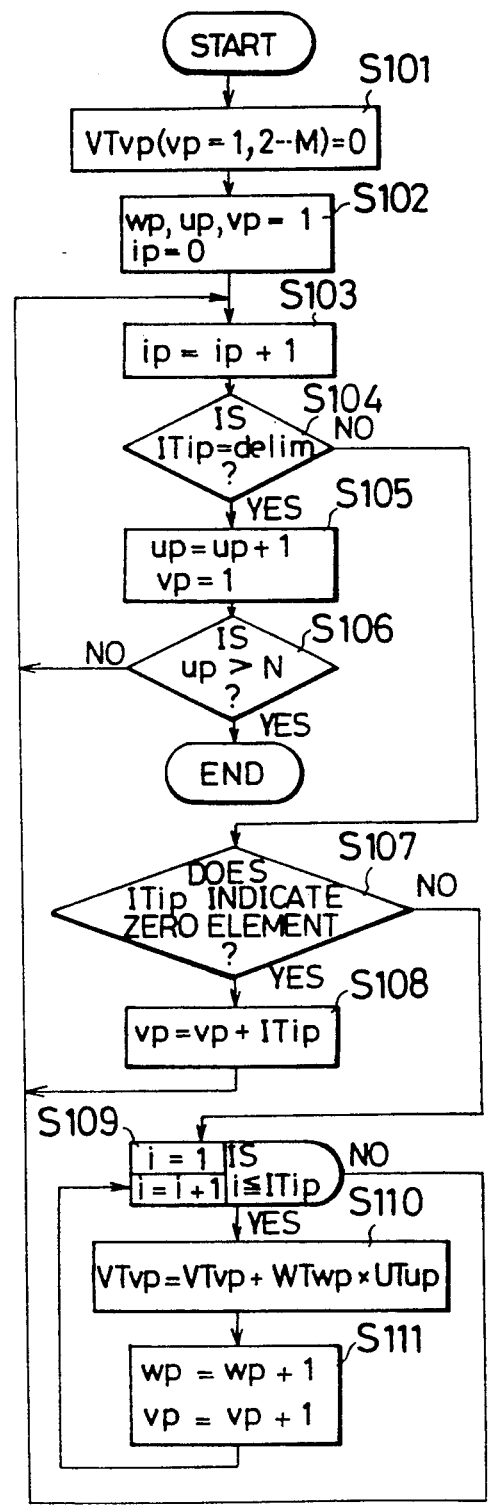
FIG. 17 is a flowchart showing another calculation algorithm used in the fourth embodiment of the present invention.

If Equations (1) and (2) for linear transformation of the respective input vectors x and u' are calculated, the calculation is executed in accordance with the calculation algorithms shown in FIGS. 16 and 17. The procedure of the fourth embodiment is substantially the same as that of the third embodiment, except that the end of each row is identified by using the end-of-row symbol "delim" (Step $S_{93}$ or $S_{104}$).

Although each of the first to fourth embodiments is arranged so that each row of the transformation matrix W is scanned from left to right, the transformation matrix W may be scanned in the column direction.

Figure 18:
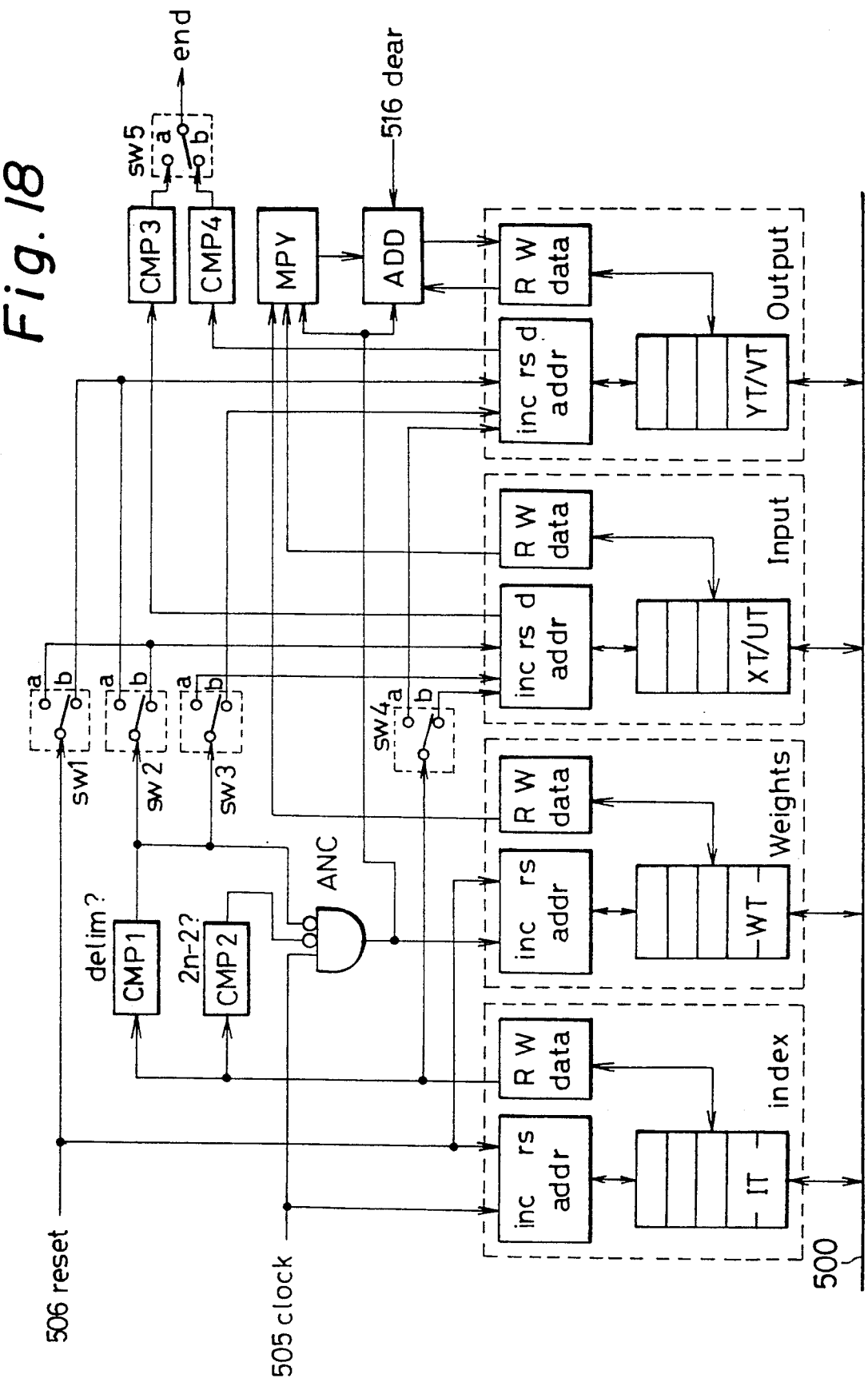
FIG. 18 is a block diagram showing an example of a hardware structure according to the first embodiment of the present invention.

FIG. 18 shows a hardware structure of an apparatus for calculating matrices according to an embodiment of the present invention for performing an algorithms of FIGS. 7 and 8.

As shown, the apparatus for calculating matrices includes comparators CMP1, CMP2, CMP3, CMP4, a multiplier MPY, an adder ADD, an AND circuit ANC, switches SW1-SW5, and memory units "Index Weights, Input, Output".

In the memory units, "IT", "WT", "XT/UT", "YT/VT" represent memories, "inc" represents an increment input of an address, "rs" represents an address reset input, and "d" represents an output terminal of address value, "R" represents a readout terminal of data, "W" represents a write-in terminal of data, respectively.

In addition, in FIG. 18, a thick line represents a parallel data line having bit widths, while a thin line represents a data line having a one bit. For example, a line extended from the data Read of the Index to the addr inc of the Output has n bits widths so that it is possible to increment the Output address equal to and more than 2 at one time. Meanwhile, a line extended from the CMP1 to the addr inc's of the Input and Output could increment one by one since it corresponds to the lowest one bit. The data bus 500 is used for setting the Index, Weight and Input as well as for resetting the Output.

Referring to FIG. 7, the operation of the apparatus for calculating matrices shown in FIG. 18 will be described in the following part.

First, a process in which each of the switches SW1-SW6 is turned to the lower portion b will be described.

After setting all the switches SW1-SW5 in the above-mentioned positions, preset the address counters of the Index, Weights, and Output to 1, reset the address counter of the Input to 0, and reset a data of the Output to 0 in accordance with the clear signal 516 (step S1).

Although a mechanism of the preset is not shown in FIG. 18, any kind of the mechanism which is capable of setting each address counter in a desired value is suitable.

When the data value of the Index is "delim", detect by the comparator CMP1 and output a positive value, otherwise output a negative value (step S2).

Reset the address of the Input to 0 and increment the address of the Output by 1 when the comparator CMP1 outputs the positive value, and also increment the address of the Index by 1 in accordance with the clock 505. However, since an AND circuit ANC exists, the address counter of the Weight is not incremented when the output of the comparator CMP1 is positive. Also, reset the data of the Output to 0 in accordance with the clear signal 16 (step S3).

Indicate an end of the first matrix calculation by outputting an end signal from the comparator CMP4 at a time when a value of the address counter of the Output exceeds a number of the rows in the matrix (step S4).

Stream the data of the Index into the addr inc of the Input as it is and set as an increment of the address counter thereof (step S5).

Holding an increment of the address of the Weight and a movement to the multiplier MPY and the adder ADD through the AND circuit ANC in a case that the comparator CMP2 detects the data of the Index being equal to $(2^n-2)$ (step S6).

Increment the address counter of the Index in accordance with the clock 505 (step S7).

Multiply a data value of the Weight with a data value of the Input by operating the multiplier MPY with a signal output from the AND circuit ANC as a trigger in a case that the data of the Index is neither "delim" nor $(2^n-2)$. Also, return a result to a data of the Output by adding the data value of the Output with the result of the multiplication by operating the adder ADD in the same manner (step S8).

In the case that the data of the Index is neither "delim" nor $(2^n-2)$, increment by one the address counter of the Weight by a signal output from the AND circuit ANC as a trigger. Also, increment by one the address counter of the Index in accordance with the clock 505 (step S9).

Second, a process in which each of the switches SW1-SW5 is turned to the upper portion a will be described.

After setting all the switches SW1-SW5 in the above-mentioned positions, set all memories of the Output to 0 by using a mechanism which is the same as the mechanism for storing the Input data and/or the data of the Weight into the memories (step S11).

Preset the values of the address counters of the Index, Weight and Input to 1 in accordance with the reset signal 506, and reset the address counter of the Output to 0 (step S12).

When the data value of the Index is "delim", detect by the comparator CMP1 and output a positive value, otherwise output a negative value (step S13).

Reset the address of the Output to 0 and increment the address of the Input by 1 when the comparator CMP1 outputs the positive value, and also increment the address of the Index by 1 in accordance with the clock 505. However, since an AND circuit ANC exists, the address counter of the Weight is not incremented when the output of the comparator CMP1 is positive (step S14).

Indicate an end of the first matrix calculation by outputting an end signal from the comparator CMP3 at a time when a value of the address counter of the Input exceeds a number of the rows in the matrix (step S15).

Stream the data of the Index into the addr inc of the Output as it is and set as an increment of the address counter thereof (step S16).

Holding an increment of the address of the Weight and a movement to the multiplier MPY and the adder ADD through the AND circuit ANC in a case that the comparator CMP2 detects the data of the Index being equal to $(2^n-2)$ (step S17).

Increment the address counter of the Index in accordance with the clock 505 (step S18).

Multiply a data value of the Weight with a data value of the Input by operating the multiplier MPY with a signal output from the AND circuit ANC as a trigger in a case that the data of the Index is neither "delim" nor ($2^n-2$). Also, return a result to a data of the Output by adding the data value of the Output with the result of the multiplication by operating the adder ADD in the same manner (step S19).

In the case that the data of the Index is neither "delim" nor ($2^n-2$), increment by one the address counter of the Weight by a signal output from the AND circuit ANC as a trigger. Also, increment by one the address counter of the Index in accordance with the clock 505 (step S20).

Many widely different embodiments of the present invention may be constructed without departing from the spirit and scope of the present invention. It should be understood that the present invention is not limited to the specific embodiments described in this specification, except as defined in the appended claims.

What is claimed is:

1. An apparatus for calculating a sum of products of proper elements in matrix, said apparatus connected to a receiving device for receiving an input vector, said apparatus being capable of reducing a required capacity of a memory and a number of calculation processes in a linear transformation of said input vector received at said receiving device by using a transformation matrix having matrix elements of a large scale sparse matrix, said apparatus comprising:

a memory for storing data used to determine whether each of said matrix elements is zero or non-zero and for storing data representative of contents of said matrix elements having non-zero;

a determining means connected to said memory for determining whether each of said matrix elements in said transformation matrix is zero or non-zero in accordance with said zero non-zero data stored in said memory; and a calculating means connected to said receiving device, said determining means, and said memory respectively for calculating said sum of products of said non-zero data store in said memory with said input vector with respect to each of said matrix elements which is identified as non-zero by said determining means, said memory being arranged to store data for specifying said matrix elements having non-zero by using an integer to give a count of said matrix elements having non-zero that are consecutively arranged, and said memory including an index table for storing integers, each of said integers giving a count of said matrix elements having zero that are consecutively arranged, and a pointer for pointing out each of said integers store in said index table.

2. An apparatus according to claim 1, wherein said index table is capable of storing an integer (pi+1) which is obtained by adding an integer 1 to a number pi placed on left side of each said matrix elements having non-zero by using said calculating means, said pi representing a number including said matrix elements having zero arranged in a row direction, said integer pi+1 being expressed with a n-bit data, said in representing a positive integer.

3. An apparatus according to claim 17, wherein said index table is further capable of storing a number qi−1 of said integer 1 consecutively, said qi representing a number of said matrix elements having non-zero which are arranged consecutively in a row direction.

4. An apparatus according to claim 3, wherein said index table is also capable of storing an end of row symbol at a time when an end of each of said row is reached.

5. An apparatus according to claim 4, wherein said index table is so arranged that said end of row symbol 1 is registered when each of said matrix elements having zero presents at said end of said each row.

6. An apparatus according to claim 4, wherein said index table is so arranged that said integer obtained by adding an integer 1 to said number pi in which said matrix elements having zero are arranged is registered by using said calculating means, said matrix elements having zero being consecutively arranged from an end of a current row to a beginning of a next row.

7. An apparatus according to claim 6, wherein said index table is so arranged that a number obtained by adding an integer 1 to a sum of numbers is registered without using said end of row symbol by using said calculating means, said sum of numbers being obtained by summing a number of said matrix elements having zero which are arranged at said end of said current row with a number of said matrix elements having zero which are arranged at said beginning of said next row.

8. An apparatus according to claim 7, wherein said index table is so arranged that said number qi of said matrix elements having non-zero is registered independently of said number pi of said matrix elements having zero.

9. An apparatus according to claim 8, wherein said number pi and said number qi are identified in accordance with the most significant bit in said n-bits per word in a case that said matrix elements having non-zero are arranged in said table.

10. An apparatus according to claim 8, wherein said matrix elements having zero and said matrix elements having non-zero are added twice by using said calculating means, respectively, in order to register a resulting integer (pi+pi+1) or (qi+qi+1) in a case that said matrix elements having zero or said matrix elements having non-zero are arranged to be continued from said end of said current row to said beginning of a succeeding row of said current row.

11. An apparatus according to claim 8, wherein a maximum number in which said matrix elements having zero or said matrix elements having non-zero are arranged is registered as an end of row symbol at a time when said end of said row is reached.

12. An apparatus according to claim 11, wherein said end of row symbol is registered in a case that a number of said matrix elements having zero or said matrix elements having non-zero are arranged is placed at said end of said row.

13. An apparatus according to claim 1, wherein said apparatus further includes an output device connected to said calculating means for outputting an output vector which is an output of said calculating means.

* * * * *